United States Patent
Chen

(10) Patent No.: US 8,386,161 B2
(45) Date of Patent: Feb. 26, 2013

(54) ROUTE PLANNING METHODS AND SYSTEMS

(75) Inventor: Mei-Ling Chen, Yonghe (TW)

(73) Assignee: MiTAC International Corp., Kuei San Hsiang (TW)

( * ) Notice: Subject to any disclaimer, the term of this patent is extended or adjusted under 35 U.S.C. 154(b) by 527 days.

(21) Appl. No.: 12/554,903

(22) Filed: Sep. 5, 2009

(65) Prior Publication Data

US 2010/0153006 A1    Jun. 17, 2010

(30) Foreign Application Priority Data

Dec. 11, 2008 (TW) .............................. 97148163 A

(51) Int. Cl.
*G01C 21/00* (2006.01)
(52) U.S. Cl. ........ 701/400; 701/533; 701/467; 701/430; 701/408; 701/411; 340/905; 340/906; 340/907; 340/995.24; 340/995.27
(58) Field of Classification Search .................. 701/411, 701/467
See application file for complete search history.

(56) References Cited

U.S. PATENT DOCUMENTS

| 4,796,189 | A | * | 1/1989 | Nakayama et al. | 701/430 |
| 5,938,720 | A | * | 8/1999 | Tamai | 701/533 |
| 6,567,743 | B1 | * | 5/2003 | Mueller et al. | 701/533 |
| 7,557,730 | B2 | * | 7/2009 | Gueziec | 340/905 |
| 7,680,596 | B2 | * | 3/2010 | Uyeki et al. | 701/414 |
| 2006/0089792 | A1 | * | 4/2006 | Manber et al. | 701/207 |
| 2008/0141129 | A1 | * | 6/2008 | Oozawa et al. | 715/702 |
| 2010/0153006 | A1 | * | 6/2010 | Chen | 701/202 |

FOREIGN PATENT DOCUMENTS

| CN | 101122468 A | 2/2008 |
| TW | I276827 | 3/2007 |

OTHER PUBLICATIONS

Office Action of corresponding CN application, issued May 18, 2011.
Office Action of corresponding CN application, issued Mar. 7, 2012.
Office Action of corresponding TW application, published Jul. 10, 2012.

* cited by examiner

*Primary Examiner* — Redhwan k Mawari
(74) *Attorney, Agent, or Firm* — Wang Law Firm, Inc.; Li K. Wang; Stephen Hsu

(57) ABSTRACT

Route planning methods and systems are provided. First, an input corresponding to a specific region is received via an input unit of a personal navigation device. Then, a first predefined location located in the specific region is determined. A first route from a first current position of the device to the first predefined location is planned.

12 Claims, 3 Drawing Sheets

US 8,386,161 B2

ROUTE PLANNING METHODS AND SYSTEMS

CROSS REFERENCE TO RELATED APPLICATIONS

This Application claims priority of Taiwan Patent Application No. 097148163, filed on Dec. 11, 2008, the entirety of which is incorporated by reference herein.

BACKGROUND OF THE INVENTION

1. Field of the Invention

The disclosure relates generally to route planning methods and systems, and, more particularly to systems and methods that perform region-based route planning and/or navigation.

2. Description of the Related Art

Recently, wireless positioning technology, such as a GPS (Global Positioning System), has become a popular application for electronic devices, such as computers and portable devices. The GPS can receive signals from satellites, and accordingly determine the position of the electronic device. Users can also use navigation software in the electronic device for route planning and navigation.

Currently, the route planning of existing navigation products always adopt a point-to-point planning method, and the destination must be precisely defined. For example, a precise destination, such as a scenic spot, an address, or coordinates must be input, and the navigation software performs the route planning according to a current position of the electronic device and the destination. That is, if the precise data of a destination is not known, the corresponding route planning cannot be performed. Additionally, users always expect the route planning to be rapidly completed, and the navigation to be began as soon as possible. Thus, it may be time-consuming when the navigation software requires input of precise data of destinations.

Generally, when the distance between a current position of a user and a destination is far, detailed indications for the surrounding environment may be more meaningful than detailed indications for reaching the destination. For example, if a user wants to go from a specific location of a northland county, to a specific destination located in midland counties, detailed indications for reaching the specific destination are not immediately meaningful, since the user initially needs detailed indications for the surrounding environment, like connected to a nearest freeway.

BRIEF SUMMARY OF THE INVENTION

Route planning methods and systems are provided.

In an embodiment of a route planning method, an input corresponding to a specific region is received via an input unit of a personal navigation device. Then, a first predefined location located in the specific region is determined. A first route from a first current position of the device to the first predefined location is planned.

An embodiment of a route planning system includes an input unit and a processing unit. The input unit receives an input corresponding to a specific region. The processing unit determines a first predefined location located in the specific region, and plans a first route from a first current position of the personal navigation device to the first predefined location.

Route planning methods and systems may take the form of a program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Route planning methods and systems are provided.

Figure 1:
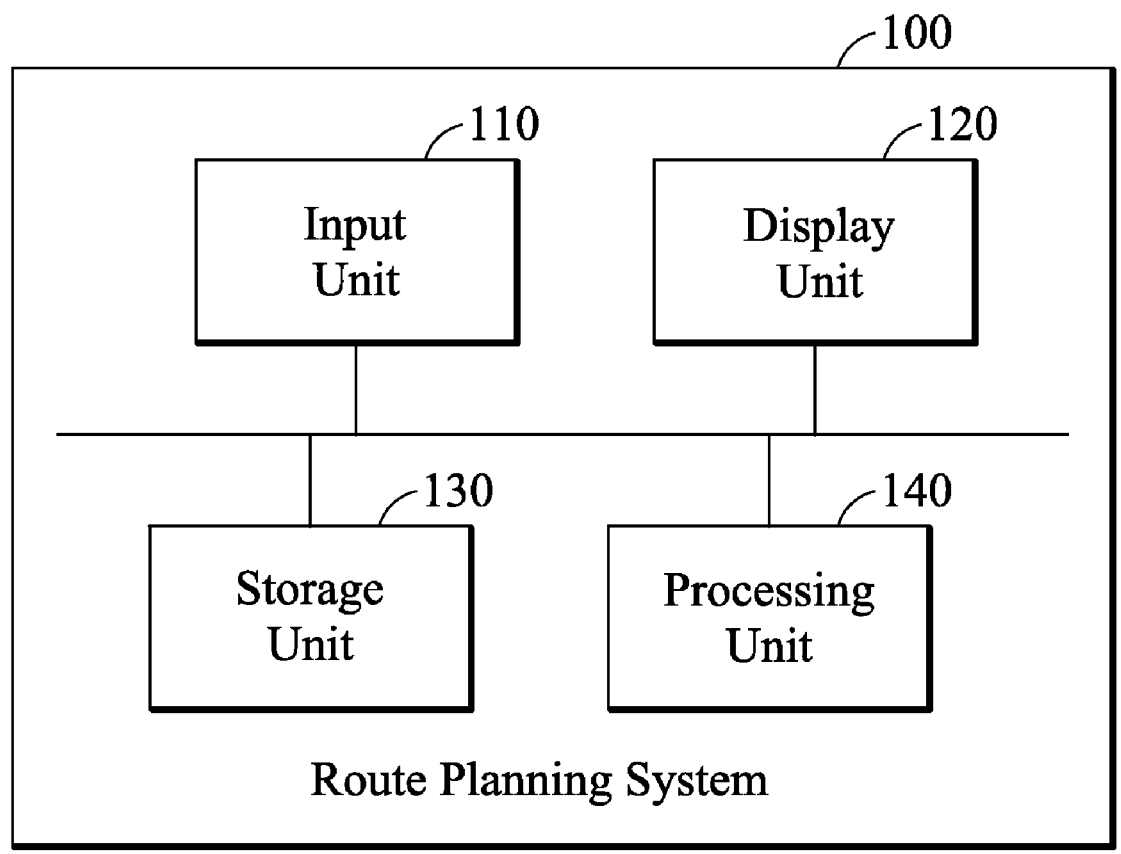
FIG. 1 is a schematic diagram illustrating an embodiment of a route planning system of the invention.

FIG. 1 is a schematic diagram illustrating an embodiment of a route planning system of the invention. The route planning system 100 can be used in an electronic device, such as a computer system and a portable device, such as a personal navigation device, having route planning and/or navigation capabilities.

The route planning system 100 comprises an input unit 110, a display unit 120, a storage unit 130, and a processing unit 140. The input unit 110 can receive inputs corresponding to input conditions, such as a specific region and/or a specific location. The display unit 120 can display related data, such as user interfaces, map data, and route planning results. In some embodiments, users can input related data via the user interface to search specific regions, specific pass-through regions, and/or specific locations. It is understood that, in some embodiments, the display unit 120 and the input unit 110 can be integrated as a touch-sensitive screen. That is, the system can display related data via the display unit 120, and users can directly perform related inputs via the display unit 120. It is understood that, in some embodiments, the input unit 110 may be a microphone to receive a voice input. The input voice can be used to perform related control processes. The storage unit 130 comprises map data corresponding to at least one region and/or location. The map data may comprise doorplate addresses, landmarks, scenic spots, and/or roads and information thereof. It is noted that, at least one predefined location, such as a location with an address, a landmark, or a scenic spot corresponding to each region can be defined and stored in the map data in advance. That is, each region can correspond to at least one predefined location. In some embodiments, the predefined location may have a label, such as a figure. The processing unit 140 may be an engine having route planning and/or navigation capabilities. The processing unit 140 performs the route planning method of the invention, which will be discussed further in the following paragraphs. It is understood that, in some embodiments, the route planning system 100 may also comprise a positioning unit to receive signals from satellites, and accordingly determine the position of the electronic device.

Figure 2:
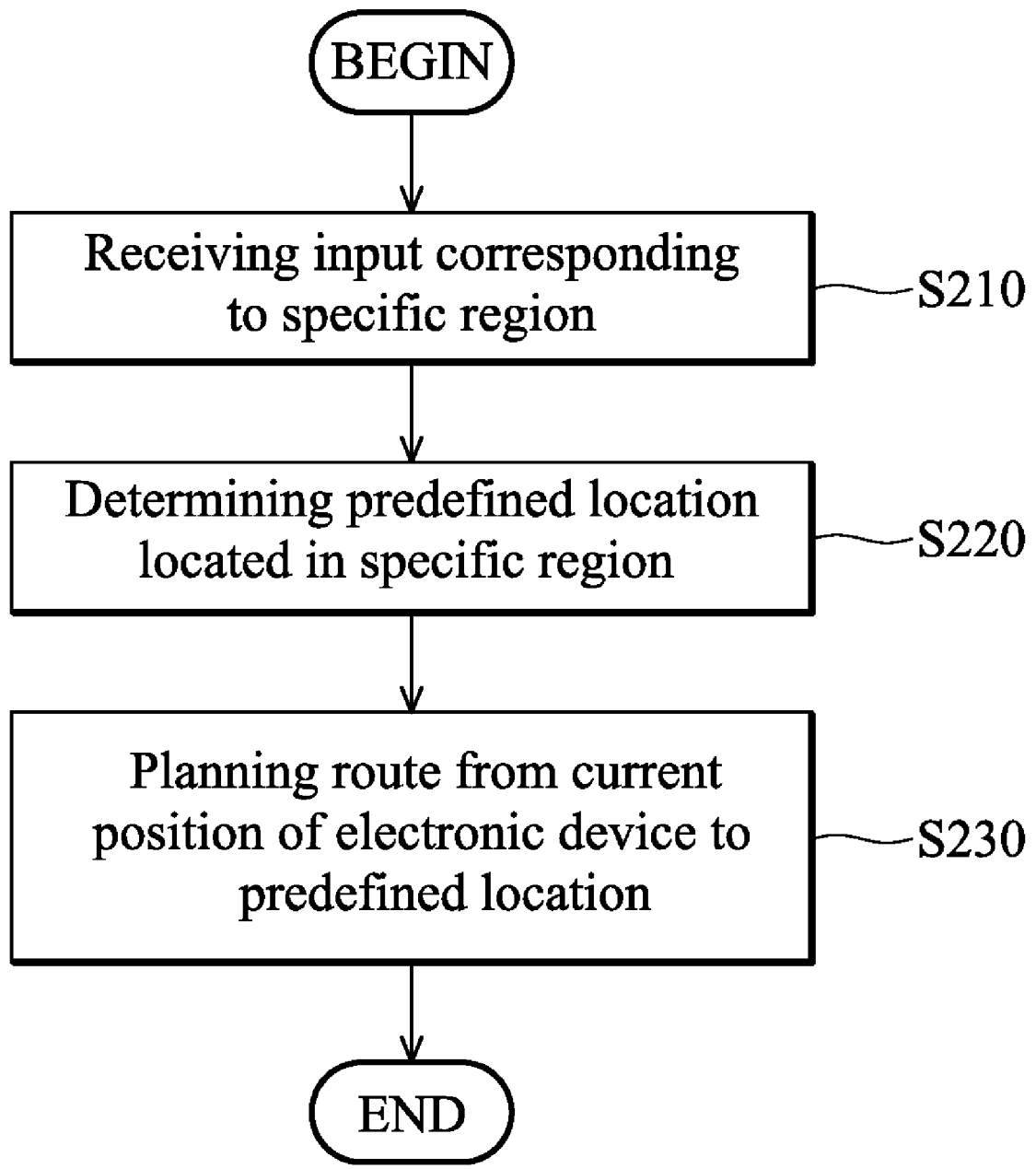
FIG. 2 is a flowchart of an embodiment of a route planning method of the invention.

FIG. 2 is a flowchart of an embodiment of a route planning method of the invention. The route planning method can be used for an electronic device, such as a computer system and a portable device, such as a personal navigation device, having route planning capability.

In step S210, an input corresponding to a specific region is received. In some embodiments, users can input voices via the input unit 110, such as a microphone, thus to input the specific region using voice. In some embodiments, users can input the specific region using texts. In some embodiments, when the display unit 120 is a touch-sensitive screen, the display unit 120 may display a map comprising the specific region, and the specific region can be selected via the display unit 120. It is understood that, the above input manners of the specific region are examples of the invention, and are not limited thereto. Additionally, in some embodiments, users can input keywords to search and obtain a plurality of candidate regions, and select one of the candidate regions as the specific region. In step S220, a first predefined location located in the specific region is determined. As described, at least one predefined location, such as a location with an address, a landmark, or a scenic spot corresponding to each region can be defined and stored in the map data in advance. It is understood that, in some embodiments, when several predefined locations are defined in the specific region, all predefined locations corresponding to the specific region are displayed for selection after the specific region is input. In step S230, a first route from a first current position of the electronic device, such as the personal navigation device to the first predefined location corresponding to the specific region is planned. It is understood that, in some embodiments, the first current position of the electronic device can be replaced by a start location defined/input by users. In some embodiments, when the first route is generated, a map, at least one landmark, and/or the first route corresponding to the specific region can be displayed in the display unit 120. Additionally, it is noted that, in some embodiments, an input corresponding to at least one pass-through region can be simultaneously received with the specific region. Similarly, the pass-through region may also correspond to a second predefined location. When the input corresponding to the pass-through region is simultaneously received, a third route is planned from the third current position of the electronic device, pass-through the second predefined location corresponding to the pass-through region, and to the first predefined location corresponding to the specific region.

Figure 3:
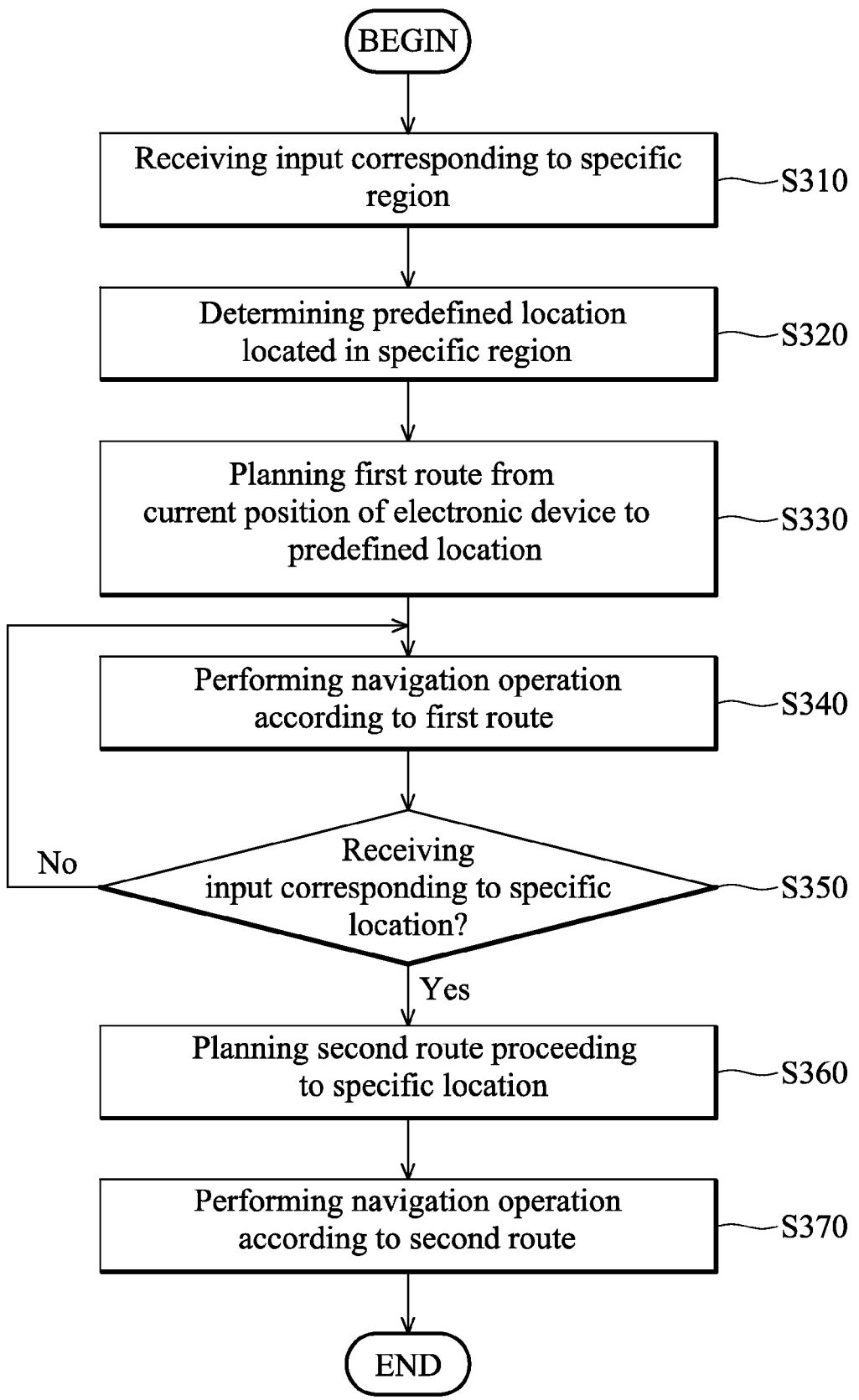
FIG. 3 is a flowchart of an embodiment of a route planning method of the invention.

FIG. 3 is a flowchart of another embodiment of a route planning method of the invention. The route planning method can be used for an electronic device, such as a computer system and a portable device, such as a personal navigation device, having route planning and navigation capabilities.

In step S310, an input corresponding to a specific region is received. Similarly, the input corresponding to the specific region can be applied using voices, texts, and/or by selecting the specific region via the touch-sensitive screen. It is noted that, the input manners of the specific region of the invention are not limited thereto. Similarly, in some embodiments, users can input keywords to search and obtain a plurality of candidate regions, and select one of the candidate regions as the specific region. In step S320, a first predefined location, such as a location with an address, a landmark, or a scenic spot located in the specific region is determined. In some embodiments, when several predefined locations are defined in the specific region, all predefined locations corresponding to the specific region are displayed for selection after the specific region is input. In step S330, a first route from a first current position of the electronic device, such as the personal navigation device and the first predefined location corresponding to the specific region is planned. Similarly, in some embodiments, the first current position of the electronic device can be replaced by a start location defined/input by users. In some embodiments, when the first route is generated, a map, at least one landmark, and/or the first route corresponding to the specific region can be displayed on the display unit 120. Similarly, in some embodiments, an input corresponding to at least one pass-through region can be simultaneously received with the specific region. When the input corresponding to the pass-through region is simultaneously received, the third route is planned, from the third current position of the electronic device, pass-through a second predefined location corresponding to the pass-through region, and to the first predefined location corresponding to the specific region. In step S340, a navigation operation is performed according to the first route, thus to proceed to the specific region. It is noted that, an input corresponding to the pass-through region can be received during the navigation based on the first route. When the pass-through region is received during the navigation, a third route is planned, from the third current position of the electronic device, pass-through a second predefined location corresponding to the pass-through region, and to the first predefined location corresponding to the specific region. The electronic device can perform a navigation operation according to the third route, thus to pass through the pass-through region and proceed to the specific region.

During the navigation based on the first route, in step S350, it is determined whether an input corresponding to a specific location has been received. It is noted that, the specific location may be in the specific region. It is also understood that, in some embodiments, the specific location may be outside of the specific region. When no input corresponding to a specific location has been received (No in step S350), the procedure returns to step S340, and the electronic device continues to perform the navigation based on the first route. It is noted that, in some embodiments, it is determined whether the distance between a latest current position of the electronic device and the first predefined location corresponding to the specific region is less than a predefined value. When the distance between the latest current position of the electronic device and the first predefined location corresponding to the specific region is less than the predefined value, an alert display mode will be displayed on the display unit 120. It is also noted that, in some embodiments, it is determined whether a latest current position of the personal navigation device is close to the specific region. When the latest current position of the personal navigation device is close to the specific region, the alert display mode is displayed. It is understood that, the alert display mode may be displaying an alert message for asking an input corresponding to a specific location, displaying a full view map corresponding to the specific region, glistening a picture of the personal navigation device, and/or displaying a button for selection, wherein when the button is selected, a picture for inputting the specific location is entered, and others.

Further, in some embodiments, a specific location or the landmark in the map can be selected via the touch-sensitive screen, thus to navigate to the selected specific location or landmark. When an input corresponding to the specific location has been received (Yes in step S350), in step S360, a second route proceeding to the specific location is planned. It is understood that, in some embodiments, the second route can be obtained by planning the second route from a second current position of the electronic device to the specific location. In some embodiments, the second route can be obtained by planning the second route from a position at a predefined distance, such as 3 kilometer from the first predefined location of the specific region in the first route, to the specific location. After the second route is generated, in step S370, the electronic device performs a navigation operation based on the second route, thus to navigate to the specific location.

For example, when a user performs a route planning and navigates to a specific location in a specific region, like Taipei County, the user can first input a specific region, such as "Taipei" to perform the route planning. The first predefined location corresponding to the specific region "Taipei" is "Taipei Station", a first route from a first current position of the electronic device to "Taipei Station" is planned, wherein the first route is a region-based route. The user can be navigated to the specific region "Taipei" using the electronic device based on the region-based route. During the navigation, the user can input a detailed address of a specific location. After the detailed address of the specific location is input, a second route from a second current position of the electronic device to the detailed address of the specific location is further planned, wherein the second route is a location-based route planning result. The user can be navigated to the specific location using the electronic device based on the location-based route.

Therefore, the route planning methods and systems can perform region-based route planning and/or navigation. Additionally, the route planning methods and systems can integrate region-based and location-based route planning and/or navigation, thus providing more flexible route planning and/or navigation capabilities.

Route planning methods and systems, or certain aspects or portions thereof, may take the form of a program code (i.e., executable instructions) embodied in tangible media, such as floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A route planning method for use in a personal navigation device, comprising the steps in order:
   receiving a first input corresponding to a specific region via an input unit of the personal navigation device;
   determining a first predefined location located in the specific region;
   planning a first route from a first current position of the personal navigation device to the first predefined location;
   performing a navigation operation according to the first route, thus navigating to the specific region;
   determining whether a latest current position of the personal navigation device is close to the specific region and displaying an alert display mode when the latest current position of the personal navigation device is close to the specific region, wherein the alert display mode comprises displaying an alert message for asking a second input corresponding to a specific location within the specific region, displaying a full view map corresponding to the specific region, glistening a picture of the personal navigation device, or displaying a button for selection, wherein when the button is selected, a picture for inputting the specific location is entered;
   planning a second route from a second current position of the personal navigation device to the specific location, wherein the second input is received during the navigation operation corresponding to the first route.

2. The method of claim 1, further comprising performing a navigation operation according to the second route, thus navigating to the specific location.

3. The method of claim 1, further comprising:
   receiving an input corresponding to a pass-through region via the input unit;
   determining a second predefined location located in the pass-through region; and
   planning a third route from a third current position of the personal navigation device, pass-through the second predefined location, and to the first predefined location.

4. The method of claim 1, further comprising displaying a map or at least one landmark corresponding to the specific region.

5. The method of claim 1, wherein the input corresponding to the specific region is performed using voices or texts, or by selecting the specific region via a touch-sensitive screen.

6. The method of claim 1, wherein when the specific region corresponds to several candidate predefined locations, the method further comprises the steps of:
   displaying the candidate predefined locations;
   receiving a selection corresponding to one of the candidate predefined locations; and
   setting the selected candidate predefined location as the first predefined location.

7. A route planning system for use in a personal navigation device, comprising:
   an input unit receiving a first input corresponding to a specific region; and
   a processing unit determining a first predefined location located in the specific region, planning a first route from a first current position of the personal navigation device to the first predefined location, performing a navigation operation according to the first route, thus to navigate to the specific region,
   wherein the processing unit further determines whether a latest current position of the personal navigation device is close to the specific region, and displays an alert display mode when the latest current position of the personal navigation device is close to the specific region;
   wherein the processing unit displays the alert display mode by displaying an alert message for asking a second input corresponding to a specific location during the navigation operation and plans a second route from a second current position of the personal navigation device to the specific location, displaying a full view map corresponding to the specific region, glistening a picture of the personal navigation device, or displaying a button for selection, wherein when the button is selected, a picture for inputting the specific location is entered,
   wherein the processing unit further performs a navigation operation according to the second route, thus to navigate to the specific location.

8. The system of claim 7, wherein the input unit further receives an input corresponding to a pass-through region via the input unit, and the processing unit further determines a second predefined location located in the pass-through region, and plans a third route from a third current position of the personal navigation device, pass-through the second predefined location, to the first predefined location.

9. The system of claim 7, further comprising a display unit displaying a map or at least one landmark corresponding to the specific region.

10. The system of claim 7, wherein the input corresponding to the specific region is performed using voices or texts, or by selecting the specific region via a touch-sensitive screen.

11. The system of claim 7, wherein when the specific region corresponds to several candidate predefined locations, the processing unit further displays the candidate predefined locations, receives a selection corresponding to one of the candidate predefined locations, and sets the selected candidate predefined location as the first predefined location.

12. A non-transitory machine-readable storage medium comprising a computer program, which, when executed, causes a device to perform a route planning method, and the method comprises:

receiving a first input corresponding to a specific region via an input unit of the device;

determining a first predefined location located in the specific region;

planning a first route from a first current position of the device to the first predefined location;

performing a navigation operation according to the first route, thus navigating to the specific region;

determining whether a latest current position of the device is close to the specific region and displaying an alert display mode when the latest current position of the device is close to the specific region, wherein the alert display mode comprises displaying an alert message for asking a second input corresponding to a specific location within the specific region, displaying a full view map corresponding to the specific region, glistening a picture of the device, or displaying a button for selection, wherein when the button is selected, a picture for inputting the specific location is entered; and planning a second route from a second current position of the personal navigation device to the specific location, wherein the second input is received during the navigation operation corresponding to the first route.

* * * * *